United States Patent
Hofström et al.

(10) Patent No.: US 9,788,318 B2
(45) Date of Patent: Oct. 10, 2017

(54) CHANNEL CAPACITY ON COLLISION BASED CHANNELS

(71) Applicant: TELEFONAKTIEBOLAGET L M ERICSSON (PUBL), Stockholm (SE)

(72) Inventors: Björn Hofström, Linköping (SE); Mårten Sundberg, Årsta (SE); John Walter Diachina, Garner, NC (US); Olof Liberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 14 days.

(21) Appl. No.: 14/828,346

(22) Filed: Aug. 17, 2015

(65) Prior Publication Data
US 2016/0050660 A1    Feb. 18, 2016

Related U.S. Application Data

(60) Provisional application No. 62/038,747, filed on Aug. 18, 2014.

(51) Int. Cl.
*H04W 72/04* (2009.01)
*H04W 72/12* (2009.01)
(Continued)

(52) U.S. Cl.
CPC ... *H04W 72/0446* (2013.01); *H04W 74/0833* (2013.01); *H04W 76/02* (2013.01)

(58) Field of Classification Search
CPC . H04W 74/0833; H04W 72/14; H04W 28/06; H04W 72/0446; H04W 28/18;
(Continued)

(56) References Cited

U.S. PATENT DOCUMENTS 6,564,061 B1 *  5/2003  Guo ............ H04W 28/18
                                        455/452.1
6,674,817 B1 *  1/2004  Dolle .......... H04B 7/2656
                                        375/342
(Continued)

FOREIGN PATENT DOCUMENTS

AU    2014201105 A1    3/2014
WO    2014025300 A1    2/2014

OTHER PUBLICATIONS

Cheng M-Y. et al: "Overload control for Machine-Type-Communications in LTE-Advanced System," IEEE Communications Magazine, IEEE Service Center, Piscataway, NJ, US, vol. 50, No. 6, Jun. 1, 2012.

(Continued)

*Primary Examiner* — Wutchung Chu

(57) ABSTRACT

The present disclosure relates generally to wireless devices (e.g., Internet of Things (IoT) devices) and, more particularly, to improving the capacity of a logical channel such as the Random Access Channel (RACH) to cater to wireless traffic (e.g., IoT traffic). In one embodiment, a wireless device, when deciding to attempt a system access in accordance with the present disclosure, would first select a Training Sequence Code (TSC) based on the device's coverage class and then transmit one or more access request bursts (each including the selected TSC) on a logical channel to a wireless access node.

36 Claims, 4 Drawing Sheets

(51) Int. Cl.
*H04W 74/08* (2009.01)
*H04W 28/02* (2009.01)
*H04W 76/02* (2009.01)

(58) Field of Classification Search
CPC . H04W 88/08; H04W 28/0247; H04W 28/20; H04W 72/04; H04W 72/12; H04W 76/00; H04W 8/26; H04W 36/0005; H04W 72/1273

See application file for complete search history.

(56) References Cited

U.S. PATENT DOCUMENTS

| | | | | |
|---|---|---|---|---|
| 8,160,166 | B2* | 4/2012 | Moffatt | H04B 1/713 375/259 |
| 8,787,957 | B2* | 7/2014 | Vujcic | H04W 74/0866 370/329 |
| 9,160,555 | B2* | 10/2015 | Kliger | H04L 12/2803 |
| 2002/0165989 | A1* | 11/2002 | Etoh | H04L 47/14 709/248 |
| 2003/0076812 | A1* | 4/2003 | Benedittis | H04W 74/002 370/350 |
| 2003/0156594 | A1* | 8/2003 | Trott | H04B 7/0851 370/442 |
| 2003/0169722 | A1* | 9/2003 | Petrus | H04B 7/2659 370/347 |
| 2004/0062211 | A1* | 4/2004 | Uhlik | H04W 52/58 370/278 |
| 2010/0172299 | A1* | 7/2010 | Fischer | H04W 74/0866 370/328 |
| 2010/0296467 | A1* | 11/2010 | Pelletier | H04W 74/002 370/329 |
| 2011/0002371 | A1* | 1/2011 | Forenza | H04B 7/0417 375/227 |
| 2011/0002411 | A1* | 1/2011 | Forenza | H04B 7/024 375/267 |
| 2011/0317636 | A1 | 12/2011 | Diachina et al. | |
| 2012/0033613 | A1 | 2/2012 | Lin et al. | |
| 2012/0243648 | A1* | 9/2012 | Currivan | H04L 25/03878 375/346 |
| 2015/0016312 | A1* | 1/2015 | Li | H04W 74/0833 370/280 |
| 2015/0215911 | A1* | 7/2015 | Dimou | H04W 48/12 370/329 |
| 2016/0021593 | A1* | 1/2016 | Chou | H04W 76/00 370/280 |
| 2016/0227580 | A1* | 8/2016 | Xiong | H04W 36/0055 |
| 2017/0134967 | A1* | 5/2017 | Dimou | H04W 24/02 |

OTHER PUBLICATIONS

Ericsson, "GSM optimization for Internet of Things", 3GPP TSG GERAN#62, Work Item Description GP-140297, Agenda item 6.1, 6.1, 7.1.5.3.6, 7.2.5.3.11, Valencia, Spain, May 26-30, 2014, the whole document.

* cited by examiner

CHANNEL CAPACITY ON COLLISION BASED CHANNELS

CLAIM OF PRIORITY

This application claims the benefit of priority to U.S. Provisional Application No. 62/038,747, filed on Aug. 18, 2014, the entire contents of which are hereby incorporated by reference for all purposes.

TECHNICAL FIELD

The present disclosure relates generally to wireless devices (e.g., Internet of Things (IoT) devices) and, more particularly, to improving the capacity of a logical channel such as the Random Access Channel (RACH) to cater to wireless traffic (e.g., IoT traffic).

BACKGROUND

The following abbreviations and terms are herewith defined, at least some of which are referred to within the following description of the present disclosure.
3GPP 3rd-Generation Partnership Project
AB Access Bursts
AGCH Access Grant Channel
ASIC Application Specific Integrated Circuit
BLER Block Error Rate
BS Base Station
BSS Base Station Subsystem
CC Coverage Class
CDMA Code Division Multiple Access
CN Core Network
CRC Cyclic Redundancy Check
DL Downlink
DSP Digital Signal Processor
EDGE Enhanced Data rates for GSM Evolution
EGPRS Enhanced General Packet Radio Service
FDMA Frequency Division Multiple Access
FN Frame Number
GSM Global System for Mobile Communications
GERAN GSM/EDGE Radio Access Network
GPRS General Packet Radio Service
HARQ Hybrid Automatic Repeat Request
IoT Internet of Things
LTE Long-Term Evolution
MCS Modulation and Coding Scheme
MTC Machine Type Communications
PDN Packet Data Network
PTCCH Packet Timing Control Channel
RACH Random Access Channel
RAN Radio Access Network
TDMA Time Division Multiple Access
TSC Training Sequence Code
UE User Equipment
UL Uplink
WCDMA Wideband Code Division Multiple Access
WiMAX Worldwide Interoperability for Microwave Access Coverage Class: At any point in time a device belongs to a specific uplink/downlink coverage class which determines the total number of blind transmissions to be used when transmitting/receiving radio blocks. An uplink/downlink coverage class applicable at any point in time can differ between different logical channels. Upon initiating a system access a device determines the uplink/downlink coverage class applicable to the RACH/AGCH based on estimating the number of blind repetitions of a radio block needed by the BSS receiver/device receiver to experience a BLER (block error rate) of approximately 10%. The BSS determines the uplink/downlink coverage class to be used by a device on the device's assigned packet channel resources based on estimating the number of blind repetitions of a radio block needed to satisfy a target BLER and considering the number of HARQ retransmissions (of a radio block) that will, on average, result from using that target BLER.

Extended Coverage: The general principle of extended coverage is that of using blind repetitions for the control channels and for the data channels. In addition, for the data channels the use of blind repetitions assuming MCS-1 (i.e., the lowest MCS supported in EGPRS today) is combined with HARQ retransmissions to realize the needed level of data transmission performance. Support for extended coverage is realized by defining different coverage classes. A different number of blind repetitions are associated with each of the coverage classes wherein extended coverage is associated with coverage classes for which multiple blind repetitions are needed (i.e., a single blind repetition is considered as the reference coverage). The number of total blind transmissions for a given coverage class can differ between different logical channels.

Internet of Things (IoT) devices: The Internet of Things (IoT) is the network of physical objects or "things" embedded with electronics, software, sensors, and connectivity to enable objects to exchange data with the manufacturer, operator and/or other connected devices based on the infrastructure of the International Telecommunication Union's Global Standards Initiative. The Internet of Things allows objects to be sensed and controlled remotely across existing network infrastructure creating opportunities for more direct integration between the physical world and computer-based systems, and resulting in improved efficiency, accuracy and economic benefit. Each thing is uniquely identifiable through its embedded computing system but is able to interoperate within the existing Internet infrastructure. Experts estimate that the IoT will consist of almost 50 billion objects by 2020.

Training Sequence Codes (TSCs): In GSM the training sequence is 26 bits long, and is included within bursts transmitted on a radio channel and is used by a receiver's equalizer as it estimates the transfer characteristic of the physical path between the BSS and a wireless device. The members of a set of TSCs are selected with the intent of each member having good autocorrelation and cross correlation properties which helps a receiver to better discriminate between the wireless devices on the same radio resource wherein different wireless devices can be assigned different TSC values.

A new cellular market segment known as Internet of Things (IoT) is exposing existing radio access technologies to new stringent requirements in terms of extended coverage and improved capacity.

To meet the first requirement of extended coverage, a typical approach used is to improve the robustness of existing radio channels through repetition based transmission schemes. To meet the second requirement of improved capacity, it is common to explore ways of increasing the multiplexing rate on channels through techniques such as Time Division Multiple Access (TDMA), Frequency Division Multiple Access (FDMA), and Code Division Multiple Access (CDMA).

While requirements of high coverage and high capacity apply to most channels in cellular systems, one channel of particular interest is the Random Access Channel (RACH).

The RACH is typically collision based, and used to support initial system access by wireless devices (e.g., IoT devices).

In light of the anticipated volume of IoT devices in the IoT market segment and their strict requirements, it is foreseeable that cellular radio access technologies will experience a dramatically increased load over the years to come. In addition to the large number of IoT devices requesting access to the cellular systems, it may be expected that the load will be further increased due to many wireless devices (including the IoT devices) operating in more challenging radio conditions wherein multiple repeated transmissions or a longer transmission time will be needed to achieve an acceptable performance (i.e., to realize sufficient coverage).

In the specific case of IoT, it may be anticipated that cellular systems need to support IoT devices of different coverage classes, as discussed in 3GPP TSG-GERAN Meeting #62 Work Item Description GP-140297, entitled "GSM optimization for Internet of Things" (the contents of which are hereby incorporated by reference) where from 1 to 'N' repeated transmissions will need to be sent by an IoT device for a single radio access event (e.g., a system access attempt on the RACH) depending on the coverage class of the IoT device. For example, while IoT devices in the best coverage class may only need a single transmission to convey a radio block, an IoT device in the worst coverage class may need to repeat the same radio block during 16 radio block transmission periods, for example, before the needed coverage can be achieved.

In the case of the collision based RACH, which is typically used for both autonomous device originated system access and system triggered (e.g., paging triggered) system access, it may be expected that the overall number of collisions will increase as a result of more IoT devices accessing the system using repetition based transmission schemes. More specifically, it is foreseeable that:

1. Collisions between system access attempts originating from IoT devices within the same coverage class will take place; and
2. Collisions between system access attempts originating from IoT devices from different coverage classes will take place.

In the first case (i.e., collisions within the same coverage class), access bursts (ABs) sent over the RACH by two or more IoT devices may reach the receiving base station (BS) at similar power levels. Without a proper design of the access burst's training sequence codes (TSC), it will be difficult for the base station to correctly receive and equalize any of the colliding access bursts especially for the case where the colliding bursts make use of the same TSC. The IoT devices may then repeat their respective access attempts, thus further increasing the load on the RACH.

In the second case (i.e., collisions from different coverage classes), the power level from an access burst(s) of the IoT device from a better coverage class may be significantly stronger than the power level from the access burst(s) from the IoT device of a worse coverage class. In this case, the base station can with a high likelihood receive the stronger access burst(s) correctly, while the likelihood of a successful reception will be much lower for the weaker access burst(s) especially for the case where the colliding bursts make use of the same TSC.

In a population of IoT devices where most of the IoT devices will be of lower coverage classes (e.g., needing no repetitions or few repetitions), this may result in fewer but still a considerable amount of IoT devices with a higher coverage class (e.g., needed more repetitions) which will be experiencing a very limited system access success rate.

With all this in mind, it is foreseeable that a bottleneck may arise regarding the capacity of the RACH to support initial system accesses by IoT devices. Further, this is not a problem that is unique to IoT devices, and IoT traffic. A similar problem can be observed in any cellular system covering dense and crowded areas of wireless devices. This problem and other problems associated with the prior art are addressed in the present disclosure.

SUMMARY

A wireless device, a wireless access node, and various methods for addressing at least the aforementioned problem are described in the independent claims. Advantageous embodiments of the wireless device, the wireless access node, and the various methods are further described in the dependent claims.

In one aspect, the present disclosure provides a wireless device configured to access a wireless access node. The wireless device comprises a processor and a memory that stores processor-executable instructions, wherein the processor interfaces with the memory to execute the processor-executable instructions, whereby the wireless device is operable to perform a selecting operation and a transmitting operation. In the selecting operation, the wireless device selects a Training Sequence Code (TSC) based on a coverage class of the wireless device. In the transmitting operation, the wireless device transmits one or more access request bursts on a logical channel to the wireless access node, wherein each of the one or more access request bursts includes the selected TSC. The wireless device has an advantage in that by using the specially selected TSC in the access request bursts, it effectively improves the capacity of the logical channel (e.g., the RACH) to cater to wireless traffic by increasing the rate of successful system access since such TSC selection and transmission allows the wireless access node to realize improved discrimination and equalization performance.

In another aspect, the present disclosure provides a method in a wireless device configured to access a wireless access node. The method comprises a selecting step and a transmitting step. In the selecting step, the wireless device selects a Training Sequence Code (TSC) based on a coverage class of the wireless device. In the transmitting step, the wireless device transmits one or more access request bursts on a logical channel to the wireless access node, wherein each of the one or more access request bursts includes the selected TSC. The method has an advantage in that by the wireless device using the specially selected TSC in the access request bursts, it effectively improves the capacity of the logical channel (e.g., the RACH) to cater to wireless traffic by increasing the rate of successful system access since such TSC selection and transmission allows the wireless access node to realize improved discrimination and equalization performance.

In yet another aspect, the present disclosure provides a wireless access node configured to interface with a wireless device. The wireless access node comprises a processor and a memory that stores processor-executable instructions, wherein the processor interfaces with the memory to execute the processor-executable instructions, whereby the wireless access node is operable to perform a receive operation. In the receive operation, the wireless access node receives one or more access request bursts on a logical channel from the wireless device, wherein each of the one or more access request bursts includes a Training Sequence Code (TSC) associated with a coverage class of the wireless device. The wireless access node has an advantage in that by receiving the access request bursts with the specially selected TSC, it can effectively improve the capacity of the logical channel (e.g., the RACH) to cater to wireless traffic by increasing the rate of successful system access since such TSC reception allows the wireless access node to realize improved discrimination and equalization performance.

In still yet another aspect, the present disclosure provides a method in a wireless access node configured to interface with a wireless device. The method comprises a receiving step. In the receiving step, the wireless access node receives one or more access request bursts on a logical channel from the wireless device, wherein each of the one or more access request bursts includes a Training Sequence Code (TSC) associated with a coverage class of the wireless device. The method has an advantage in that by the wireless access node receiving the access request bursts with the specially selected TSC, it can effectively improve the capacity of the logical channel (e.g., the RACH) to cater to wireless traffic by increasing the rate of successful system access since such TSC reception allows the wireless access node to realize improved discrimination and equalization performance.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
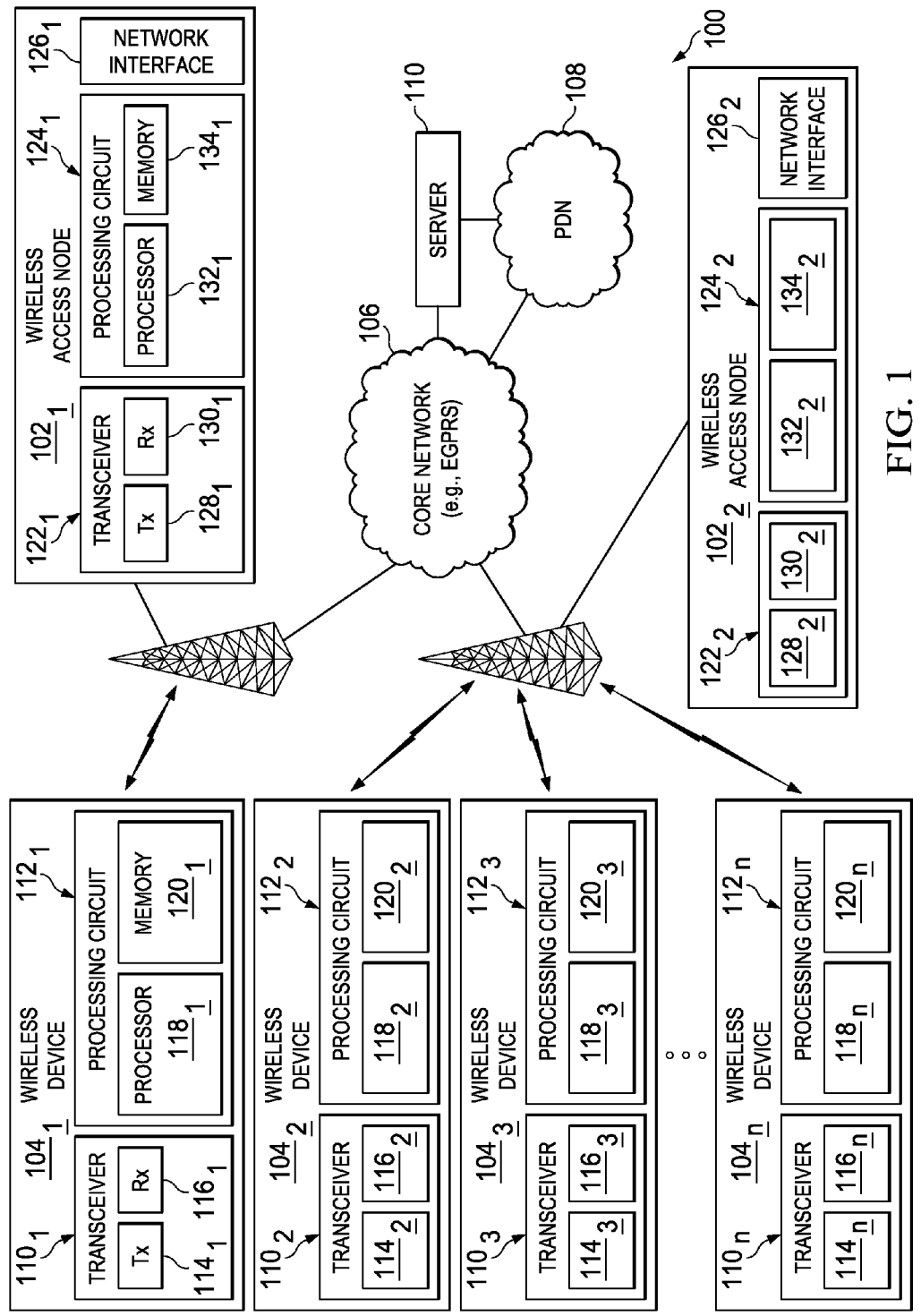
FIG. 1 is a diagram of an exemplary wireless communication network which includes multiple wireless devices (e.g., IoT devices) and multiple wireless access nodes (e.g., base stations) all of which are configured in accordance with an embodiment of the present disclosure.

To describe the technical features of the present disclosure, a discussion is provided first to describe an exemplary wireless communication network which includes multiple wireless devices (e.g., IoT devices) and multiple wireless access nodes (e.g., base stations) all of which are configured in accordance with the present disclosure (illustrated in FIG. 1). Then, a discussion is provided to explain the basic functionalities-configurations of the wireless device (e.g., IoT devices) and the wireless access nodes (e.g., base stations) in accordance with the present disclosure (illustrated in FIGS. 2-5). Thereafter, a discussion is provided to explain in more detail the functionalities-configurations of the wireless device (e.g., IoT devices) and the wireless access nodes (e.g., base stations) in accordance with the present disclosure (illustrated in FIG. 6).

Exemplary Wireless Communication Network 100

Referring to FIG. 1, there is illustrated an exemplary wireless communication network 100 in accordance with the present disclosure. The wireless communication network 100 includes multiple wireless access nodes $102_1$ and $102_2$ (only two shown), multiple wireless devices $104_1$, $104_2$, $104_3$ ... $104_n$, and a core network 106 (e.g., EGPRS core network 106). The wireless communication network 100 also includes many other well-known components, but for clarity, only the components needed to describe the features of the present disclosure are described herein. Further, the wireless communication network 100 is described herein as being an GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, WCDMA, LTE, and WiMAX systems.

The wireless communication network 100 includes the wireless access nodes $102_1$ and $102_2$ (only two shown) which provide network access to the wireless devices $104_1$, $104_2$, $104_3$ ... $104_n$. In this example, the wireless access node $102_1$ is providing network access to wireless device $104_1$ while the wireless access node $102_2$ is providing network access to wireless devices $104_2$, $104_3$ ... $104_n$. The wireless access nodes $102_1$ and $102_2$ are connected to the core network 106 (e.g., EGPRS core network 106). The core network 106 is connected to an external packet data network (PDN) 108, such as the Internet, and a server 110 (only one shown). The wireless devices $104_1$, $104_2$, $104_3$ ... $104_n$ may communicate with one or more servers 110 (only one shown) connected to the core network 106 or the PDN 108.

The wireless devices $104_1$, $104_2$, $104_3$ ... $104_n$ may refer generally to an end terminal (user) that attaches to the wireless communication network 100, and may refer to either an IoT device or MTC device (e.g., smart meter) or a non-IoT/MTC device. Thus, the term may be synonymous with the term mobile device, mobile station (MS), "User Equipment" or UE, as that term is used by the 3rd-Generation Partnership Project (3GPP), and includes standalone wireless devices, such as terminals, cell phones, tablets, smart phones, and wireless-equipped personal digital assistants, as well as wireless cards or modules that are designed for attachment to or insertion into another electronic device, such as a personal computer, electrical meter, etc.

Likewise, unless the context clearly indicates otherwise, the terms "wireless access node $102_1$ and $102_2$" and "RAN node" are used herein in their most general sense to refer to a base station or wireless access point in a wireless communication network, and may refer to wireless access nodes that are controlled by a physically distinct radio network controller as well as to more autonomous access points, such as the so-called evolved Node Bs (eNodeBs) in LTE networks.

Each wireless device $104_1$, $104_2$, $104_3$ ... $104_n$ may include a transceiver circuit $110_1$, $110_2$, $110_3$ ... $110_n$ for communicating with the wireless access nodes $102_1$ and $102_2$, and a processing circuit $112_1$, $112_2$, $112_3$ ... $112_n$ for processing signals transmitted from and received by the transceiver circuit $110_1$, $110_2$, $110_3$ ... $110_n$ and for controlling the operation of the corresponding wireless device $104_1$, $104_2$, $104_3$ ... $104_n$. The transceiver circuit $110_1$, $110_2$, $110_3$ ... $110_n$ may include a transmitter $114_1$, $114_2$, $114_3$ ... $114_n$ and a receiver $116_1$, $116_2$, $116_3$ ... $116_n$, which may operate according to any standard, e.g., the GSM/EDGE standard. The processing circuit $112_1$, $112_2$, $112_3$ ... $112_n$ may include a processor $118_1$, $118_2$, $118_3$ ... $118_n$ and a memory $120_1$, $120_2$, $120_3$ ... $120_n$ for storing program code for controlling the operation of the corresponding wireless device $104_1$, $104_2$, $104_3$ ... $104_n$. The program code may include code for performing the procedures (e.g., determining a TSC for a system access attempt based on a coverage class; determining a set of TSCs for a system access attempt based on a coverage class; selecting a TSC from a set of TSCs; reselecting a different TSC from a set of TSCs) as described hereinafter.

Each wireless access node $102_1$ and $102_2$ may include a transceiver circuit $122_1$ and $122_2$ for communicating with wireless devices $104_1$, $104_2$, $104_3$ ... $104_n$, a processing circuit $124_1$ and $124_2$ for processing signals transmitted from and received by the transceiver circuit $122_1$ and $122_2$ and for controlling the operation of the corresponding wireless access node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$ and a memory $134_1$ and $134_2$ for storing program code for controlling the operation of the corresponding wireless access node $102_1$ and $102_2$. The program code may include code for performing the procedures (e.g., assigning, determining, and/or communicating a TSC for a device based on a coverage class; assigning, determining, and/or communicating a set of TSCs for a device based on a coverage class; resolving system access attempt collisions between two devices based on correlation properties of the TSCs of the system access attempts; determining a mapping of channel bursts on a frame structure; modifying a mapping of channel bursts on a frame structure) as described hereinafter.

Figure 2:
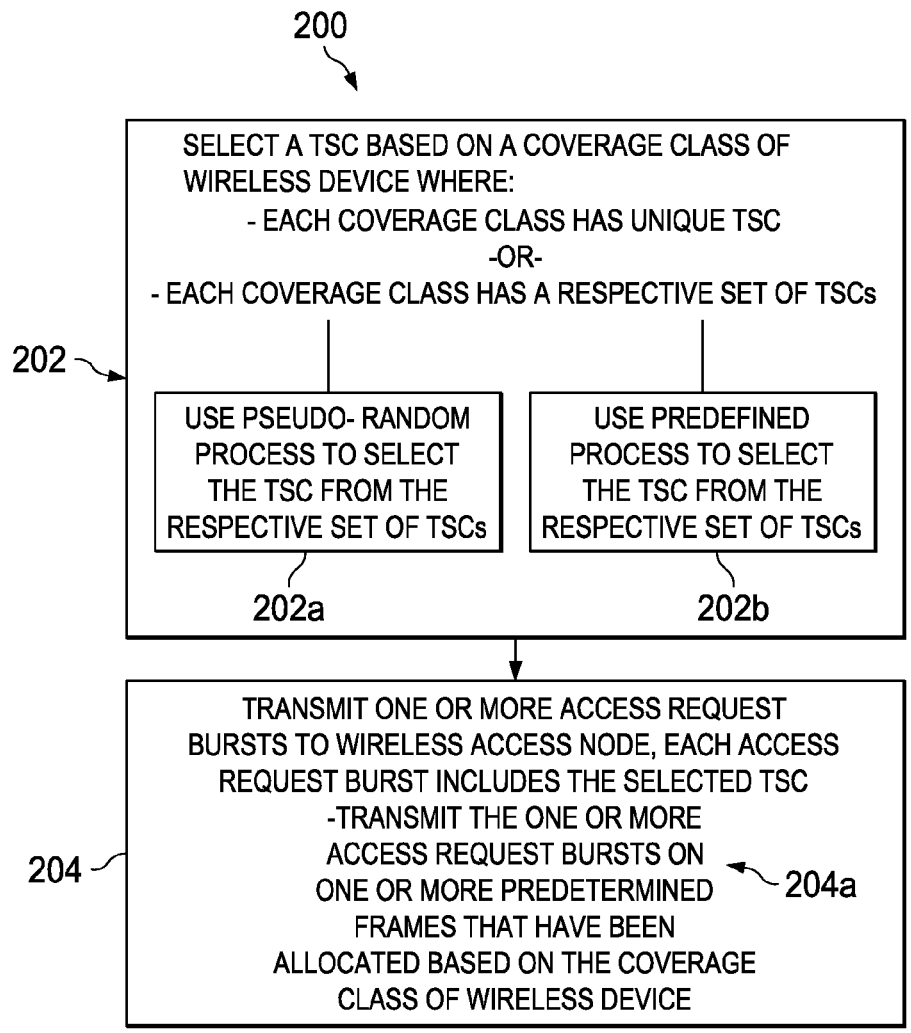
FIG. 2 is a flowchart of a method implemented in a wireless device (e.g., IoT device) in accordance with an embodiment of the present disclosure.

Basic Functionalities-Configurations of Wireless Device and Wireless Access Node Referring to FIG. 2, there is a flowchart of a method 200 implemented in a wireless device $104_2$ (for example) in accordance with an embodiment of the present disclosure. At step 202, the wireless device $104_2$ selects a TSC based on a coverage class of the wireless device $104_2$. In one example, the wireless device $104_2$ can have anyone of a number of coverage classes and a unique TSC is associated with each coverage class. In an alternative example, the wireless device $104_2$ can have anyone of a number of coverage classes and a respective set of TSCs is associated with each coverage class. In the alternative example, the wireless device $104_2$ can use a pseudo-random process (step 202a) or a predefined process (step 202b) to select a TSC from the respective set of TSCs associated with the coverage class of the wireless device $104_2$. At step 204, the wireless device $104_2$ transmits one or more access request bursts (e.g., one or more repetitive access request bursts) on a logical channel (e.g., the RACH) to the wireless access node $102_2$, where each transmitted access request burst includes the selected TSC. The number of transmitted access request burst(s) depends on the coverage class of the wireless device $104_2$. For instance, if the wireless device $104_2$ has a coverage class "1" then there may be one transmitted access burst. If the wireless device $104_2$ has a coverage class "2" then there may be two transmitted access bursts (two repetitive access bursts) etc. . . . Further, the wireless device $104_2$ can at step 204a transmit the one or more access request bursts on one or more pre-determined frames of the logical channel that have been allocated based on the coverage class of the wireless device $104_2$. Hence, the wireless device $104_2$'s specific coverage class has an effect on which TSC is selected, how many access request bursts(s) are transmitted, and in which frame(s) of the logical channel the access request burst(s) are transmitted. The other wireless devices $104_1$, $104_3$ ... $104_n$ (which may or may not be IoT devices) can also be configured to perform method 200. The method 200 will be described in more detail hereinafter.

Figure 3:
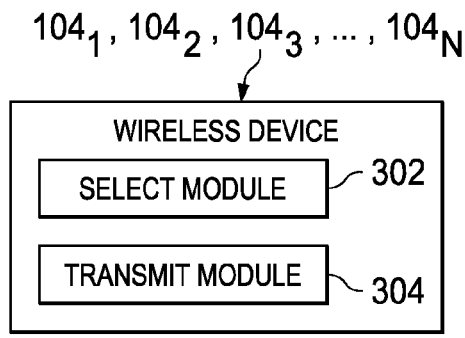
FIG. 3 is a block diagram illustrating structures of an exemplary wireless device (e.g., IoT device) configured in accordance with an embodiment of the present disclosure.

Referring to FIG. 3, there is a block diagram illustrating structures of an exemplary wireless device $104_2$ (for example) configured in accordance with an embodiment of the present disclosure. In one embodiment, the wireless device $104_2$ may comprise a select module 302 and a transmit module 304. The select module 302 is configured to select a TSC based on a coverage class of the wireless device $104_2$. In one example, the wireless device $104_2$ can have anyone of a number of coverage classes and a unique TSC is associated with each coverage class. In an alternative example, the wireless device $104_2$ can have anyone of a number of coverage classes and a respective set of TSCs is associated with each coverage class. In the alternative example, the select module 302 can use a pseudo-random process or a predefined process to select a TSC from the respective set of TSCs associated with the coverage class of the wireless device $104_2$. The transmit module 304 is configured to transmit one or more access request bursts (e.g., one or more repetitive access request bursts) on a logical channel (e.g., the RACH) to the wireless access node $102_2$, where each of the transmitted one or more access request bursts includes the selected TSC. The number of transmitted access request burst(s) depends on the coverage class of the wireless device $104_2$. For instance, if the wireless device $104_2$ has a coverage class "1" then there may be one transmitted access burst. If the wireless device $104_2$ has a coverage class "2" then there may be two transmitted access bursts (two repetitive access bursts) etc. . . . Further, the transmit module 304 can be configured to transmit the one or more access request bursts on one or more pre-determined frames of the logical channel that have been allocated based on the coverage class of the wireless device $104_2$. Hence, the wireless device $104_2$'s specific coverage class has an effect on which TSC is selected, how many access request bursts(s) are transmitted, and in which frame(s) of the logical channel the access request burst(s) are transmitted.

As those skilled in the art will appreciate, the above-described modules 302 and 304 of the wireless device $104_2$ (for example) may be implemented separately as suitable dedicated circuits. Further, the modules 302 and 404 can also be implemented using any number of dedicated circuits through functional combination or separation. In some embodiments, the modules 302 and 304 may be even combined in a single application specific integrated circuit (ASIC). As an alternative software-based implementation, the wireless device $104_2$ (for example) may comprise a memory $120_2$, a processor $118_2$ (including but not limited to a microprocessor, a microcontroller or a Digital Signal Processor (DSP), etc.) and a transceiver $110_2$. The memory $120_2$ stores machine-readable program code executable by the processor $118_2$ to cause the wireless device $104_2$ (for example) to perform the steps of the above-described method 200. It should be appreciated that the other wireless devices $104_1$, $104_3$ ... $104_n$ (which may or may not be IoT devices) can also be configured in a similar manner to perform method 200.

Figure 4:
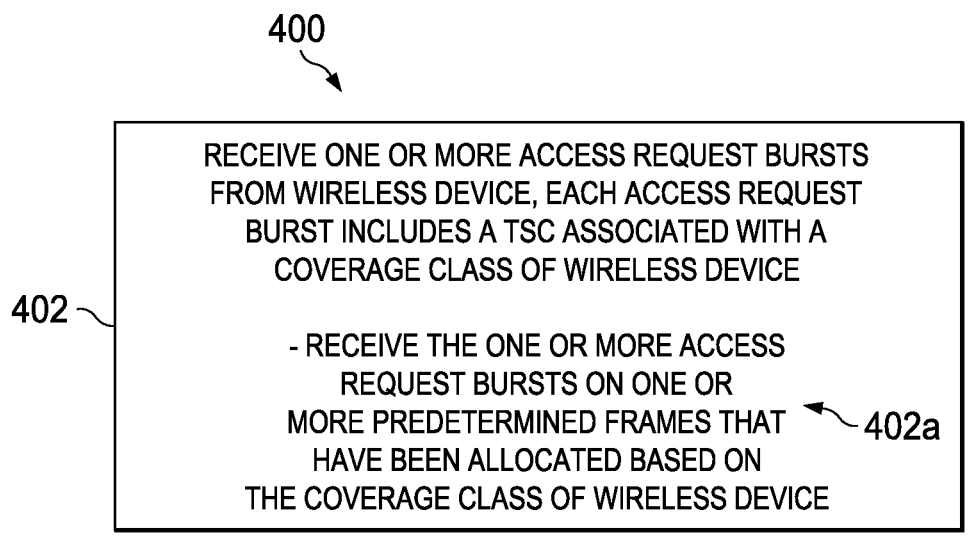
FIG. 4 is a flowchart of a method implemented in a wireless access node (e.g., base station) in accordance with an embodiment of the present disclosure.

Referring to FIG. 4, there is a flowchart of a method 400 implemented in a wireless access node $102_2$ (for example) configured to interface with a wireless device $104_2$ (for example) in accordance with an embodiment of the present disclosure. At step 402, the wireless access node $102_2$ receives one or more access request bursts on a logical channel (e.g., the RACH) from the wireless device $104_2$ (for example). Each of the received one or more access request bursts includes a TSC which is associated with a coverage class of the wireless device $104_2$ (for example). In one example, the wireless device $104_2$ can have anyone of a number of coverage classes and a unique TSC is associated with each coverage class, and the wireless device $104_2$ would have selected the unique TSC associated with its particular coverage class and then transmitted the one or more access request bursts (each of which includes the unique TSC) which are received by the wireless access node $102_2$. In an alternative example, the wireless device $104_2$ can have anyone of a number of coverage classes and a respective set of TSCs is associated with each coverage class, and the wireless device $104_2$ would have selected one of the TSCs of the respective set associated with the wireless device's particular coverage class and then transmitted the one or more access request bursts (each of which includes the selected TSC) which are received by the wireless access node $102_2$. Further, the wireless access node $102_2$ can at step 402a receive the one or more access request bursts on one or more pre-determined frames of the logical channel that have been allocated based on the coverage class of the wireless device $104_2$. The wireless access node $102_2$ can also be configured to perform method 400 to interface with the other wireless devices $104_3$ ... $104_n$. Plus, the other wireless access node $102_1$ can be configured to perform method 400 to interface with wireless device $104_1$. The method 400 will be described in more detail hereinafter.

Figure 5:
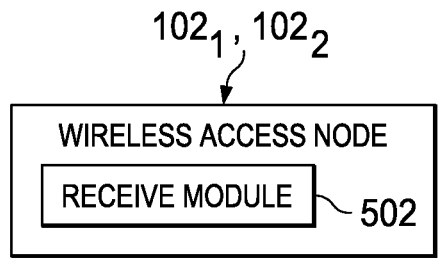
FIG. 5 is a block diagram illustrating a structure of an exemplary wireless access node (e.g., base station) configured in accordance with an embodiment of the present disclosure; and, FIG. 6 is a diagram illustrating coverage class specific RACH access requests opportunities associated with a detailed example where a wireless communication network supports five coverage classes in accordance with an embodiment of the present disclosure.

Referring to FIG. 5, there is a block diagram illustrating a structure of an exemplary wireless access node $102_2$ (for example) configured to interface with a wireless device $104_2$ (for example) in accordance with an embodiment of the present disclosure. In one embodiment, the wireless access node $102_2$ may comprise a receive module 502. The receive module 502 is configured to receive one or more access request bursts on a logical channel (e.g., the RACH) from the wireless device $104_2$ (for example). Each of the received one or more access request bursts includes a TSC which is associated with a coverage class of the wireless device $104_2$ (for example). In one example, the wireless device $104_2$ can have anyone of a number of coverage classes and a unique TSC is associated with each coverage class, and the wireless device $104_2$ would have selected the unique TSC associated with its particular coverage class and then transmitted the one or more access request bursts (each of which includes the unique TSC) which are received by the receive module 502. In an alternative example, the wireless device $104_2$ can have anyone of a number of coverage classes and a respective set of TSCs is associated with each coverage class, and the wireless device $104_2$ would have selected one of the TSCs of the respective set associated with the wireless device's particular coverage class and then transmitted the one or more access request bursts (each of which includes the selected TSC) which are received by the receive module 502. Further, the receive module 502 can be configured to receive the one or more access request bursts on one or more pre-determined frames of the logical channel that have been allocated based on the coverage class of the wireless device $104_2$.

As those skilled in the art will appreciate, the above-described receive module 502 of the wireless access node $102_2$ (for example) may be implemented as a dedicated circuit. Further, the receive module 502 can also be implemented using any number of dedicated circuits through functional combination or separation. In some embodiments, the receive module 502 may be in a single application specific integrated circuit (ASIC). As an alternative software-based implementation, the wireless access node $102_2$ (for example) may comprise a memory $134_2$, a processor $132_2$ (including but not limited to a microprocessor, a microcontroller or a Digital Signal Processor (DSP), etc.) and a transceiver $128_2$. The memory $134_2$ stores machine-readable program code executable by the processor $132_2$ to cause the wireless access node $102_2$ (for example) to perform the above-described method 400. It should be appreciated that the wireless access node $102_1$ may be configured in a similar manner to perform the above-described method 400. The method 400 will be described in more detail hereinafter.

Detailed Functionalities-Configurations of Wireless Device and Wireless Access Node As described above, the disclosed techniques of the present disclosure include introducing a new TSC for the access request burst(s), which are sent by the wireless device $104_2$ (for example) over a logical channel (e.g., RACH, PTCCH) to the wireless access node $102_2$ (e.g., base station $102_2$), where the new TSC is based on the coverage class of the transmitting wireless device $104_2$ (for example). A detailed example of how this may be implemented is described below and a proposal for the selection of the actual TSC is also presented.

In one embodiment, for improving the RACH capacity to cater to IoT traffic, the assignment of a TSC to a wireless device $104_2$ (for example) is tightly coupled to the coverage class of the wireless device $104_2$ (for example), in that a unique TSC is defined per each coverage class. For example, in a cellular IoT system that supports "N" different coverage classes, each coverage class may be associated with a unique TSC which is associated with a set of TSCs with optimized autocorrelation and cross correlation properties. In such a system, a collision between system access attempts originating from wireless devices $104_2$, $104_3$ ... $104_n$ of different coverage classes will be resolvable with a higher likelihood, relative to legacy systems, by the receiving wireless access node $102_2$ (e.g., BS $102_2$), because the wireless access node $102_2$ (e.g., BS $102_2$) can take advantage of the good correlation properties of the TSCs in the colliding access request bursts.

In another embodiment, for improving the RACH capacity to cater to IoT traffic, the assignment of a TSC to a wireless device $104_2$ (for example) is tightly coupled to the coverage class of the wireless device $104_2$ (for example), in that a unique TSC set is defined per coverage class. For example, in a cellular IoT system that supports "N" different coverage classes, each coverage class is associated with a unique TSC set from which a wireless device $104_2$ (for example) will (e.g., in a randomized manner) select a TSC from the appropriate TSC set based on the wireless device $104_2$'s coverage class each time the wireless device $104_2$ attempts a system access. As the TSC sets will be optimized with good autocorrelation and cross correlation properties, both within and in-between the TSC sets, collisions between system access attempts originating from wireless devices $104_2$, $104_3$ ... $104_n$ of both the same coverage class and different coverage classes will be resolvable with a higher likelihood, relative to legacy systems, by the receiving wireless access node $102_2$ (e.g., BS $102_2$).

In some embodiments, the TSC selected from a specific TSC set based on coverage class is performed by the wireless device $104_2$ (for example) according to a pseudo random selection process. For instance, the wireless device $104_2$ (for example) may use time (e.g., frame and/or burst number) and/or an identifier (e.g., Temporary Mobile Station Identity (TMSI)) of the wireless device $104_2$ (e.g., IoT wireless device $104_2$) as an input seed for the pseudo random selection process to select the TSC from a specific TSC set. In other embodiments, the TSC selection may be predefined and known by the wireless device $104_2$ (for example), determined by the wireless device $104_2$ (for example), accessible by the wireless device $104_2$ (for example), or communicated to the wireless device $104_2$ (for example) by the receiving wireless access node $102_2$ (e.g., BS $102_2$).

In addition, the number of available TSCs associated with a given coverage class could reflect the expected number of wireless devices $104_2$, $104_3$ ... $104_n$ for that coverage class. This will lower the risk of wireless device $104_2$, $104_3$ ... $104_n$ in a populated coverage class experiencing collisions with other wireless device $104_2$, $104_3$ ... $104_n$ in the same coverage class using the same TSC.

In some embodiments, other collision based logical channels in addition to the RACH and non-collision based logical channels can be used to support transmissions from wireless devices $104_1$, $104_2$, $104_3$ ... $104_n$ of different coverage classes by using a similar concept as proposed above. For example, in the case of Global System for Mobile (GSM), the Packet Timing Control Channel (PTCCH) uplink uses the same access burst format as used in the RACH. The embodiments described above are therefore also applicable to the PTCCH and would enable the multiplexing of multiple access request bursts on the PTCCH uplink to increase its capacity.

As described above, the disclosed techniques of the present disclosure teach introducing a new TSC for the access request burst(s) which are sent over the RACH and/or PTCCH channels, where the new TSC is based on the coverage class of the transmitting wireless device $104_1$, $104_2$, $104_3$ ... $104_n$. A detailed example of how this may be implemented is described below where there are five different coverage classes supported in a cellular IoT system. In this example, the RACH supported within the context of this cellular IoT system will need the set of available RACH bursts to be organized (pre-determined) to reflect the coverage classes of the supported wireless devices $104_1$, $104_2$, $104_3$ ... $104_n$ (e.g., IoT devices $104_1$, $104_2$, $104_3$ ... $104_n$. For example, the following organization could be supported for the example of five coverage classes:

Coverage Class 1 Devices: Each RACH burst, including a TSC from a Coverage Class 1 set of TSCs, provides a single system access opportunity.

Coverage Class 2 Devices: A set of 2 consecutive RACH bursts, each including one and the same TSC from a Coverage Class 2 set of TSCs, provides a single system access opportunity.

Coverage Class 3 Devices: A set of 4 consecutive RACH bursts, each including one and the same TSC from a Coverage Class 3 set of TSCs, provides a single system access opportunity.

Coverage Class 4 Devices: A set of 8 consecutive RACH bursts, each including one and the same TSC from a Coverage Class 4 set of TSCs, provides a single system access opportunity.

Coverage Class 5 Devices: A set of 16 consecutive RACH bursts, each including one and the same TSC from a Coverage Class 5 set of TSCs, provides a single system access opportunity.

Figure 6:
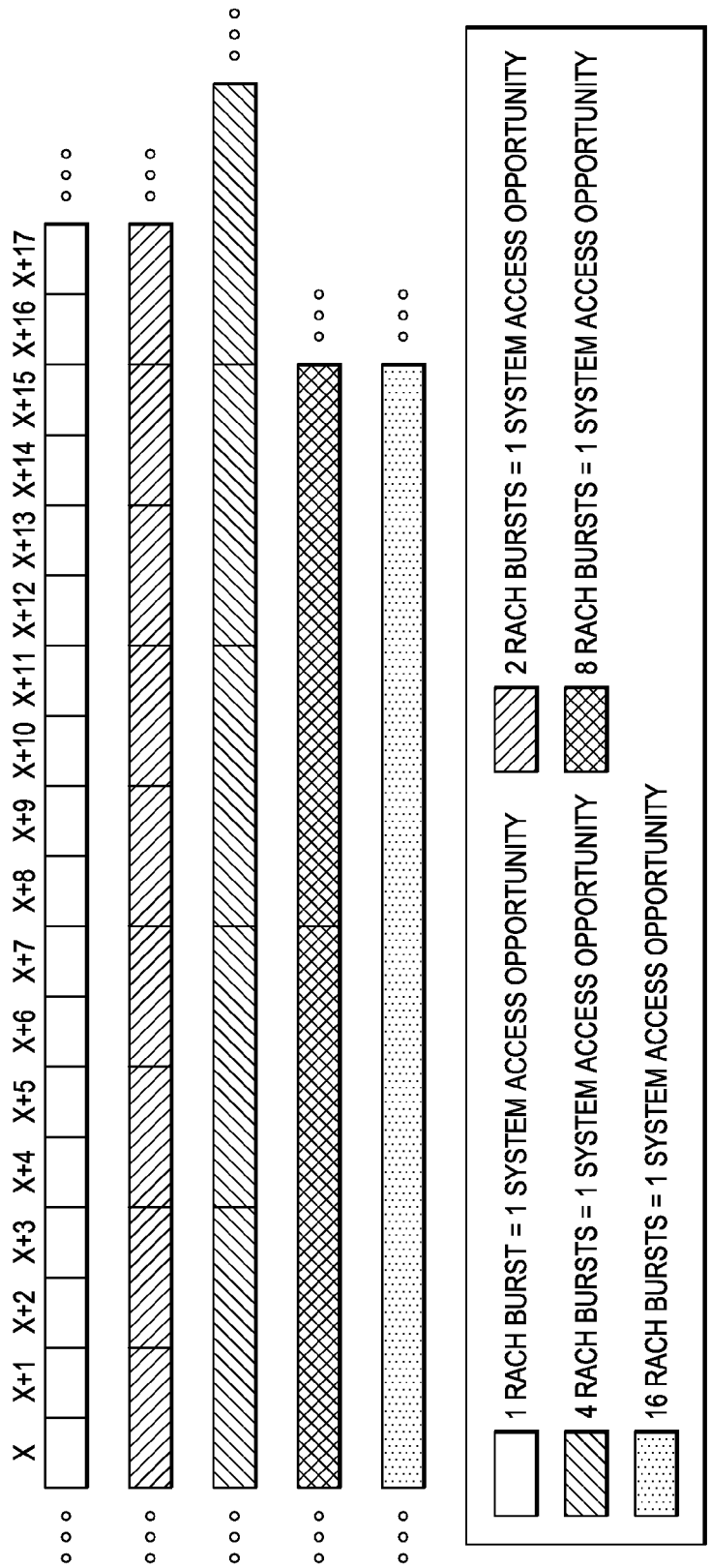

FIG. 6 outlines an exemplary mapping of RACH bursts on a frame structure according to the above organization for five coverage classes, where it is illustrated that wireless devices $104_1$, $104_2$, $104_3$ ... $104_n$ (e.g., IoT devices $104_1$, $104_2$, $104_3$ ... $104_n$) are restricted to using a specific subset of RACH bursts as the first of the 'N' RACH bursts the wireless devices $104_1$, $104_2$, $104_3$ ... $104_n$ need to send for a single system access attempt. For example, the burst X+4 can be used as the first burst of an access attempt needing the transmission of 1, 2, or 4 consecutive bursts associated with wireless devices having a coverage class of 1, 2, or 3 but cannot be used as the first burst of an access attempt needing the transmission of 8 or 16 consecutive bursts associated with wireless devices having a coverage class of 4 or 5.

The specific burst X can be determined using various methods, such as burst X equals the uplink burst of timeslot 1 occurring in a TDMA frame for which Frame Number (FN) equals 0, burst X+1 equals the uplink burst of timeslot 1 occurring in a TDMA frame for which FN equals 1, etcetera. In other words, the wireless device can transmit the access request burst(s) on the pre-determined frame(s) specifically allocated based on the coverage class of the wireless device. In continuing the example with five coverage classes, the wireless devices $104_1$, $104_2$, $104_3$ ... $104_n$ would transmit their access request burst(s) on the pre-determined frame(s) as follows:

Coverage Class 1 Devices: the wireless device is operable to transmit one access request burst on one pre-determined frame allocated based on the coverage class "1" of the wireless device. The one access request burst includes the TSC selected based on the coverage class "1" of the wireless device.

Coverage Class 2 Devices: the wireless device is operable to transmit two access request bursts on two pre-determined frames allocated based on the coverage class "2" of the wireless device. The two access request bursts would be the same or repetitions. That is, the second access request burst would be a repeat of the first access request burst. Plus, each of the two access request bursts includes the TSC selected based on the coverage class "2" of the wireless device.

Coverage Class 3 Devices: the wireless device is operable to transmit four access request bursts on four pre-determined frames allocated based on the coverage class "3" of the wireless device. The four access request bursts would be the same or repetitions. Plus, each of the four access request bursts includes the TSC selected based on the coverage class "3" of the wireless device;

Coverage Class 4 Devices: the wireless device is operable to transmit eight access request bursts on eight pre-determined frames allocated based on the coverage class "4" of the wireless device. The eight access request bursts would be the same or repetitions. Plus, each of the eight access request bursts includes the TSC selected based on the coverage class "4" of the wireless device.

Coverage Class 5 Devices: the wireless device is operable to transmit sixteen access request bursts on sixteen pre-determined frames allocated based on the coverage class "5" of the wireless device. The sixteen access request bursts would be the same or repetitions. Plus, each of the sixteen access request bursts includes the TSC selected based on the coverage class "5" of the wireless device.

With this coverage class centric organization of the available RACH bursts, as described above, each wireless device $104_1, 104_2, 104_3 \ldots 104_n$ can, when deciding to attempt system access, select a TSC value according to the device's coverage class. The same TSC would be used for each burst transmitted by the wireless device during an access attempt in order to support the use of coherent combination of the repeated transmissions at the wireless access node $102_1$ and $102_2$. If a first access attempt fails, for example, due to a collision with an access attempt of another wireless device from the same coverage class using the same TSC, then the wireless device may reselect a different TSC from its assigned set and perform another access attempt. As collisions are more likely among wireless devices $104_1, 104_2, 104_3 \ldots 104_n$ in highly populated coverage classes, it may be beneficial to assign these coverage classes extra-large TSC sets. This will decrease the risk of colliding RACH access request which are using the same TSC and thereby improve probability of the wireless access node $102_1$ and $102_2$ successfully receiving an access request.

It should be appreciated that the TSC based pre-determined RACH burst utilization indicated by the alignment of RACH bursts shown in FIG. 6 could be modified so as to minimize the number of access request bursts that can serve as the first burst of a coverage class specific access request and at the same time spread the processing of blind detection over different burst periods at the wireless access node $102_1$ and $102_2$. For example, the following modification could be applied:

The first burst needed for coverage class 1 devices and the first burst of the set of 2 bursts needed for coverage class 2 devices can occur as per the above organization, as illustrated in FIG. 6.

The first burst of the set of 4 bursts needed for coverage class 3 devices can occur with TDMA frames for which FN mod 4=3 (e.g., bursts X+3, X+7, X+11, . . . ).

The first burst of the set of 8 bursts needed for coverage class 4 devices can occur with TDMA frames for which FN mod 8=5 (e.g., bursts X+5, X+13, X+21, . . . ).

The first burst of the set of 16 bursts needed for coverage class 5 devices can occur with TDMA frames for which FN mod 16=9 (e.g., bursts X+9, X+25, X+41, . . . ).

In view of the foregoing disclosure, it should be appreciated that the techniques of the present disclosure have many advantages some of which are as follows:

The system access success rate using the RACH can be improved, as described herein.

The capacity of collision based channels and non-collision based channels can be improved as multiple wireless devices of different coverage classes can be multiplexed on a same radio resource.

The RACH can be used by new devices to access the system without legacy devices needing to understand the content signaled in the access bursts. This allows a redesign of the RACH information elements according to the needs of the new devices.

In the case of GSM and the PTCCH, the improved capacity can be used to either increase the capacity of the timing advance procedure, or to increase its accuracy through more frequent transmission over the PTCCH (i.e., more frequent use of PTCCH by a given wireless device will be possible and will result in greater time accuracy).

In yet an additional embodiment of the present disclosure, the wireless device $104_1, 104_2, 104_3 \ldots 104_n$ can select a TSC in step 202 based on a coverage class and capability of the wireless device. For instance, different TSC's may also be used to indicate different capabilities among the wireless device $104_1, 104_2, 104_3 \ldots 104_n$ (e.g., IoT devices $104_1, 104_2, 104_3 \ldots 104_n$) The capability of a wireless device that could be indicated by the TSC value selected could be, for example, the set of modulation and coding schemes that the wireless device supports.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A wireless device configured to access a wireless access node, the wireless device comprising:
   a processor; and,
   a memory that stores processor-executable instructions, wherein the processor interfaces with the memory to execute the processor-executable instructions, whereby the wireless device is operable to:

select a Training Sequence Code (TSC) based on a coverage class of the wireless device; and, transmit one or more access request bursts on a logical channel to the wireless access node, wherein each of the one or more access request bursts includes the selected TSC, wherein the wireless device is operable to perform the transmitting operation by transmitting the one or more access request bursts on one or more pre-determined frames that have been allocated based on the coverage class of the wireless device, and wherein the wireless device is operable to use a certain access request burst as a first burst in an access attempt needing a transmission of one of a multiple number of consecutive access request bursts when the wireless device has one of a multiple number of coverage classes, but the certain access request burst cannot be used as a first burst of another access attempt needing a transmission of one of another multiple number of consecutive access request bursts when the wireless device has one of another multiple number of coverage classes.

2. The wireless device of claim 1, wherein:

when the wireless device has a coverage class "1", the wireless device is operable to transmit one access request burst on one pre-determined frame allocated based on the coverage class "1" of the wireless device, wherein the one access request burst includes the TSC selected based on the coverage class "1" of the wireless device;

when the wireless device has a coverage class "2", the wireless device is operable to transmit two access request bursts on two pre-determined frames allocated based on the coverage class "2" of the wireless device, wherein the two access request bursts are repetitions and each of the two access request bursts includes the TSC selected based on the coverage class "2" of the wireless device;

when the wireless device has a coverage class "3", the wireless device is operable to transmit four access request bursts on four pre-determined frames allocated based on the coverage class "3" of the wireless device, wherein the four access request bursts are repetitions and each of the four access request bursts includes the TSC selected based on the coverage class "3" of the wireless device;

when the wireless device has a coverage class "4", the wireless device is operable to transmit eight access request bursts on eight pre-determined frames allocated based on the coverage class "4" of the wireless device, wherein the eight access request bursts are repetitions and each of the eight access request bursts includes the TSC selected based on the coverage class "4" of the wireless device; and, when the wireless device has a coverage class "5", the wireless device is operable to transmit sixteen access request bursts on sixteen pre-determined frames allocated based on the coverage class "5" of the wireless device, wherein the sixteen access request bursts are repetitions and each of the sixteen access request bursts includes the TSC selected based on the coverage class "5" of the wireless device.

3. The wireless device of claim 1, wherein the wireless device has one of a plurality of coverage classes and a unique TSC is associated with each coverage class of the plurality of coverage classes.

4. The wireless device of claim 1, wherein the wireless device has one of a plurality of coverage classes and a respective set of Training Sequence Codes (TSCs) is associated with each coverage class of the plurality of coverage classes.

5. The wireless device of claim 4, wherein the wireless device is operable to perform the select operation by:

using a pseudo-random process to select the TSC from the respective set of TSCs associated with the coverage class of the wireless device; or using a predefined process to select the TSC from the respective set of TSCs associated with the coverage class of the wireless device.

6. The wireless device of claim 4, wherein a number of TSCs in the respective set of TSCs that is associated with the wireless device is based on an expected number of wireless devices having a same coverage class as the wireless device.

7. The wireless device of claim 1, wherein the logical channel is a Random Access Channel (RACH) or a Packet Timing Control Channel (PTCCH).

8. The wireless device of claim 1, wherein:

the wireless device has a coverage class "1" and is operable to transmit one access request burst on one pre-determined frame allocated based on the coverage class "1" of the wireless device, wherein the one access request burst includes the TSC selected based on the coverage class "1" of the wireless device.

9. The wireless device of claim 1, wherein the wireless device has one of a plurality of coverage classes and a respective set of Training Sequence Codes (TSCs) is associated with each coverage class of the plurality of coverage classes, and wherein the wireless device is operable to perform the select operation by using a pseudo-random process to select the TSC from the respective set of TSCs associated with the coverage class of the wireless device.

10. The wireless device of claim 1, wherein:

when the wireless device has a coverage class "1", the wireless device is operable to transmit one access request burst on one pre-determined frame allocated based on the coverage class "1" of the wireless device, wherein the one access request burst includes the TSC selected based on the coverage class "1" of the wireless device; and when the wireless device has a coverage class other than coverage class "1", the wireless device is operable to transmit a number, 'N', of access request bursts on N pre-determined frames allocated based on the coverage class of the wireless device, wherein the N access request bursts are repetitions, and each of the N access request bursts includes the TSC selected based on the coverage class of the wireless device.

11. A method in a wireless device configured to access a wireless access node, the method comprising:

selecting a Training Sequence Code (TSC) based on a coverage class of the wireless device; and, transmitting one or more access request bursts on a logical channel to the wireless access node, wherein each of the one or more access request bursts includes the selected TSC, wherein the transmitting step further comprises transmitting the one or more access request bursts on one or more pre-determined frames that have been allocated based on the coverage class of the wireless device, and wherein transmitting the one or more access request bursts comprises using a certain access request burst as a first burst in an access attempt needing a transmission of one of a multiple number of consecutive access request bursts when the wireless device has one of a multiple number of coverage classes, but the certain access request burst cannot be used as a first burst of another access attempt needing a transmission of one of another multiple number of consecutive access request bursts when the wireless device has one of another multiple number of coverage classes.

12. The method of claim 11, wherein:
when the wireless device has a coverage class "1", the wireless device is operable to transmit one access request burst on one pre-determined frame allocated based on the coverage class "1" of the wireless device, wherein the one access request burst includes the TSC selected based on the coverage class "1" of the wireless device;
when the wireless device has a coverage class "2", the wireless device is operable to transmit two access request bursts on two pre-determined frames allocated based on the coverage class "2" of the wireless device, wherein the two access request bursts are repetitions and each of the two access request bursts includes the TSC selected based on the coverage class "2" of the wireless device;
when the wireless device has a coverage class "3", the wireless device is operable to transmit four access request bursts on four pre-determined frames allocated based on the coverage class "3" of the wireless device, wherein the four access request bursts are repetitions and each of the four access request bursts includes the TSC selected based on the coverage class "3" of the wireless device;
when the wireless device has a coverage class "4", the wireless device is operable to transmit eight access request bursts on eight pre-determined frames allocated based on the coverage class "4" of the wireless device, wherein the eight access request bursts are repetitions and each of the eight access request bursts includes the TSC selected based on the coverage class "4" of the wireless device; and,
when the wireless device has a coverage class "5", the wireless device is operable to transmit sixteen access request bursts on sixteen pre-determined frames allocated based on the coverage class "5" of the wireless device, wherein the sixteen access request bursts are repetitions and each of the sixteen access request bursts includes the TSC selected based on the coverage class "5" of the wireless device.

13. The method of claim 11, wherein the wireless device has one of a plurality of coverage classes and a unique TSC is associated with each coverage class of the plurality of coverage classes.

14. The method of claim 11, wherein the wireless device has one of a plurality of coverage classes and a respective set of Training Sequence Codes (TSCs) is associated with each coverage class of the plurality of coverage classes.

15. The method of claim 14, wherein the selecting step further comprises:
using a pseudo-random process to select the TSC from the respective set of TSCs associated with the coverage class of the wireless device; or
using a predefined process to select the TSC from the respective set of TSCs associated with the coverage class of the wireless device.

16. The method of claim 14, wherein a number of TSCs in the respective set of TSCs that is associated with the wireless device is based on an expected number of wireless devices having a same coverage class as the wireless device.

17. The method of claim 11, wherein the logical channel is a Random Access Channel (RACH) or a Packet Timing Control Channel (PTCCH).

18. The method of claim 11, wherein:
the wireless device has a coverage class "1" and is operable to transmit one access request burst on one pre-determined frame allocated based on the coverage class "1" of the wireless device, wherein the one access request burst includes the TSC selected based on the coverage class "1" of the wireless device.

19. The method of claim 11, wherein the wireless device has one of a plurality of coverage classes and a respective set of Training Sequence Codes (TSCs) is associated with each coverage class of the plurality of coverage classes, and wherein the selecting step further comprises using a pseudo-random process to select the TSC from the respective set of TSCs associated with the coverage class of the wireless device.

20. The method of claim 11, wherein:
when the wireless device has a coverage class "1", the wireless device is operable to transmit one access request burst on one pre-determined frame allocated based on the coverage class "1" of the wireless device, wherein the one access request burst includes the TSC selected based on the coverage class "1" of the wireless device; and
when the wireless device has a coverage class other than coverage class "1", the wireless device is operable to transmit a number, 'N', of access request bursts on N pre-determined frames allocated based on the coverage class of the wireless device, wherein the N access request bursts are repetitions and each of the N access request bursts includes the TSC selected based on the coverage class of the wireless device.

21. A wireless access node configured to interface with a wireless device, the wireless access node comprising:
a processor; and,
a memory that stores processor-executable instructions, wherein the processor interfaces with the memory to execute the processor-executable instructions, whereby the wireless access node is operable to:
receive one or more access request bursts on a logical channel from the wireless device, wherein each of the one or more access request bursts includes a Training Sequence Code (TSC) associated with a coverage class of the wireless device,
wherein the wireless access node is operable to perform the receive operation by receiving the one or more access request bursts on one or more pre-determined frames that have been allocated based on the coverage class of the wireless device, and
wherein the wireless access node is operable to use a certain access request burst as a first burst in an access attempt needing a transmission of one of a multiple number of consecutive access request bursts when the wireless device has one of a multiple number of coverage classes, but the certain access request burst cannot be used as a first burst of another access attempt needing a transmission of one of another multiple number of consecutive access request bursts when the wireless device has one of another multiple number of coverage classes.

22. The wireless access node of claim 21, wherein:
the wireless device has one of a plurality of coverage classes and a unique TSC is associated with each coverage class of the plurality of coverage classes; or the wireless device has one of a plurality of coverage classes and a respective set of Training Sequence Codes (TSCs) is associated with each coverage class of the plurality of coverage classes.

23. The wireless access node of claim 22, wherein a number of TSCs in the respective set of TSCs that is associated with the wireless device is based on an expected number of wireless devices having a same coverage class as the wireless device.

24. The wireless access node of claim 21, wherein the logical channel is a Random Access Channel (RACH) or a Packet Timing Control Channel (PTCCH).

25. The wireless access node of claim 21, wherein:
the wireless device has a coverage class "1", and the wireless access node is operable to receive one access request burst on one pre-determined frame allocated based on the coverage class "1" of the wireless device, wherein the one access request burst includes the TSC selected based on the coverage class "1" of the wireless device.

26. The wireless access node of claim 21, wherein:
when the wireless device has a coverage class "1", the wireless access node is operable to receive one access request burst on one pre-determined frame allocated based on the coverage class "1" of the wireless device, wherein the one access request burst includes the TSC selected based on the coverage class "1" of the wireless device;
when the wireless device has a coverage class "2", the wireless access node is operable to receive two access request bursts on two pre-determined frames allocated based on the coverage class "2" of the wireless device, wherein the two access request bursts are repetitions and each of the two access request bursts includes the TSC selected based on the coverage class "2" of the wireless device;
when the wireless device has a coverage class "3", the wireless access node is operable to receive four access request bursts on four pre-determined frames allocated based on the coverage class "3" of the wireless device, wherein the four access request bursts are repetitions and each of the four access request bursts includes the TSC selected based on the coverage class "3" of the wireless device;
when the wireless device has a coverage class "4", the wireless access node is operable to receive eight access request bursts on eight pre-determined frames allocated based on the coverage class "4" of the wireless device, wherein the eight access request bursts are repetitions and each of the eight access request bursts includes the TSC selected based on the coverage class "4" of the wireless device; and,
when the wireless device has a coverage class "5", the wireless access node is operable to receive sixteen access request bursts on sixteen pre-determined frames allocated based on the coverage class "5" of the wireless device, wherein the sixteen access request bursts are repetitions and each of the sixteen access request bursts includes the TSC selected based on the coverage class "5" of the wireless device.

27. The wireless access node of claim 21, wherein the wireless device has one of a plurality of coverage classes and a respective set of Training Sequence Codes (TSCs) is associated with each coverage class of the plurality of coverage classes, and wherein the TSC is selected, by the wireless device using a pseudo-random process, from the respective set of TSCs associated with the coverage class of the wireless device.

28. The wireless access node of claim 21, wherein:
when the wireless device has a coverage class "1", the wireless access node is operable to receive one access request burst on one pre-determined frame allocated based on the coverage class "1" of the wireless device, wherein the one access request burst includes the TSC selected based on the coverage class "1" of the wireless device; and
when the wireless device has a coverage class other than coverage class "1", the wireless access node is operable to receive a number, 'N', of access request bursts on N pre-determined frames allocated based on the coverage class of the wireless device, wherein the N access request bursts are repetitions and each of the N access request bursts includes the TSC selected based on the coverage class of the wireless device.

29. A method in a wireless access node configured to interface with a wireless device, the method comprising:
receiving one or more access request bursts on a logical channel from the wireless device, wherein each of the one or more access request bursts includes a Training Sequence Code (TSC) associated with a coverage class of the wireless device,
wherein the receiving step further comprises receiving the one or more access request bursts on one or more pre-determined frames that have been allocated based on the coverage class of the wireless device, and
wherein receiving the one or more access request bursts comprises using a certain access request burst as a first burst in an access attempt needing a transmission of one of a multiple number of consecutive access request bursts when the wireless device has one of a multiple number of coverage classes, but the certain access request burst cannot be used as a first burst of another access attempt needing a transmission of one of another multiple number of consecutive access request bursts when the wireless device has one of another multiple number of coverage classes.

30. The method of claim 29, wherein:
the wireless device has one of a plurality of coverage classes and a unique TSC is associated with each coverage class of the plurality of coverage classes; or
the wireless device has one of a plurality of coverage classes and a set of Training Sequence Codes (TSCs) is associated with each coverage class of the plurality of coverage classes.

31. The method of claim 30, wherein a number of TSCs in the respective set of TSCs that is associated with the wireless device is based on an expected number of wireless devices having a same coverage class as the wireless device.

32. The method of claim 29, wherein the logical channel is a Random Access Channel (RACH) or a Packet Timing Control Channel (PTCCH).

33. The method of claim 29, wherein:
the wireless device has a coverage class "1", and the wireless access node is operable to receive one access request burst on one pre-determined frame allocated based on the coverage class "1" of the wireless device, wherein the one access request burst includes the TSC selected based on the coverage class "1" of the wireless device.

34. The method of claim 29, wherein:
when the wireless device has a coverage class "1", the wireless access node is operable to receive one access request burst on one pre-determined frame allocated based on the coverage class "1" of the wireless device, wherein the one access request burst includes the TSC selected based on the coverage class "1" of the wireless device;

when the wireless device has a coverage class "2", the wireless access node is operable to receive two access request bursts on two pre-determined frames allocated based on the coverage class "2" of the wireless device, wherein the two access request bursts are repetitions and each of the two access request bursts includes the TSC selected based on the coverage class "2" of the wireless device;

when the wireless device has a coverage class "3", the wireless access node is operable to receive four access request bursts on four pre-determined frames allocated based on the coverage class "3" of the wireless device, wherein the four access request bursts are repetitions and each of the four access request bursts includes the TSC selected based on the coverage class "3" of the wireless device;

when the wireless device has a coverage class "4", the wireless access node is operable to receive eight access request bursts on eight pre-determined frames allocated based on the coverage class "4" of the wireless device, wherein the eight access request bursts are repetitions and each of the eight access request bursts includes the TSC selected based on the coverage class "4" of the wireless device; and, when the wireless device has a coverage class "5", the wireless access node is operable to receive sixteen access request bursts on sixteen pre-determined frames allocated based on the coverage class "5" of the wireless device, wherein the sixteen access request bursts are repetitions and each of the sixteen access request bursts includes the TSC selected based on the coverage class "5" of the wireless device.

35. The method of claim 29, wherein the wireless device has one of a plurality of coverage classes and a respective set of Training Sequence Codes (TSCs) is associated with each coverage class of the plurality of coverage classes, and wherein the TSC is selected, by the wireless device using a pseudo-random process, from the respective set of TSCs associated with the coverage class of the wireless device.

36. The method of claim 29, wherein:

when the wireless device has a coverage class "1", the wireless access node is operable to receive one access request burst on one pre-determined frame allocated based on the coverage class "1" of the wireless device, wherein the one access request burst includes the TSC selected based on the coverage class "1" of the wireless device; and when the wireless device has a coverage class other than coverage class "1", the wireless access node is operable to receive a number, 'N', of access request bursts on N pre-determined frames allocated based on the coverage class of the wireless device, wherein the N access request bursts are repetitions and each of the N access request bursts includes the TSC selected based on the coverage class of the wireless device.

\* \* \* \* \*